Patented Feb. 22, 1944

2,342,147

UNITED STATES PATENT OFFICE 2,342,147

ETIO-CHOLENIC ACID DERIVATIVES AND METHOD OF MAKING SAME

Percy L. Julian, Maywood, and John Wayne Cole, Chicago, Ill., assignors to The Glidden Company, Cleveland, Ohio, a corporation of Ohio No Drawing. Original application April 16, 1941, Serial No. 388,899, now Patent No. 2,304,101, dated December 8, 1942. Divided and this application August 29, 1942, Serial No. 456,702

10 Claims. (Cl. 260—397.4)

The present invention relates to certain derivatives of 3-hydroxy etio-cholenic acid, particularly 3 hydroxy or 3 acyloxy-20 ketones of the cyclopentano polyhydrophenanthrene.

Hitherto there have been no well defined methods for re-establishing the side chain of sterols and building up new side chains, by beginning with bile acids or acids secured by the oxidative degradation of sterols. The present invention provides a method for converting a bile acid or an acid secured by oxidation of sterols into a ketone containing one or more carbon atoms more than the original acid.

It is accordingly an object of the present invention to provide a novel process for the preparation of new as well as known ketones in the sterol series.

Another object is to produce new intermediates useful for the production of homologs of the corpus luteum hormone.

Other objects will be apparent from the description of the invention.

It has been found that 3-acetoxy etio-cholenic acid is readily converted to the acid chloride upon treatment with thionyl chloride. The acid chloride may then be treated with an alkyl or aryl compound of zinc, cadmium or aluminum to convert the acid chloride into the corresponding ketone. Upon further treatment and oxidation in a known manner of the 3-hydroxy group the corresponding di-ketones may be formed. Thus when the organo metallic compound is a methyl compound progesterone may be produced and when aryl or multi-carbon alkyl organo metallic compounds are used it is possible to produce homologs of progesterone from the hydroxy ketone.

The reactions involved may be represented by the following scheme in which R is an acyl group.

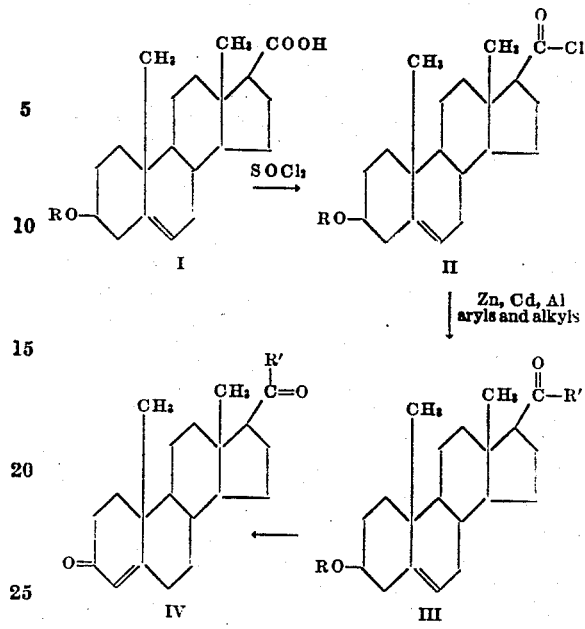

It is to be noted that treatment with the zinc, aluminum and cadmium compounds does not result in reaction at the -3-RO group and consequently hydrolysis is not necessary before treatment with the organo-metallic compound in order to prevent undue loss of this reactant.

The following example is illustrative of the invention:

Example

A solution containing di-methyl-cadmium was prepared by adding 2 grams of powdered anhydrous cadmium chloride to an ether solution of 3.5 grams of methyl magnesium iodide, and stirring the mixture for one hour. An ether solution of 0.35 gram of 3-acetoxy-Δ⁵-etio-cholenic acid chloride was added during five minutes, with stirring, then the mixture was stirred and warmed for six hours. The cooled material was shaken with cold dilute hydrochloric acid, and the ether layer separated, washed with water, sodium carbonate solution, and again with water. Concentration of the ether solution gave 0.30 gram of crystalline ketone 3-acetoxy-Δ⁵-etio-cholenyl-methyl ketone melting at about 143° C. No acid could be recovered from the sodium carbonate solution.

In place of dimethyl cadmium, methyl zinc chloride or other cadmium, zinc or aluminum alkyls or phenyls may be employed. Thus in the foregoing example the dimethyl cadmium may be replaced with phenyl zinc chloride.

When prepared by the oxidative degradation of sterols the 3-acetoxy acid is usually formed. However, 3-hydroxy acids may be used as starting materials and the 3-OH group replaced with the acetoxy group or other suitable group. The 3-hydroxy group may then of course be restored in the ketone in any suitable manner.

This application is a division of application Serial No. 388,899, filed April 16, 1941.

Having described the invention, what is claimed is:

1. The process which comprises subjecting an acid chloride of the formula:

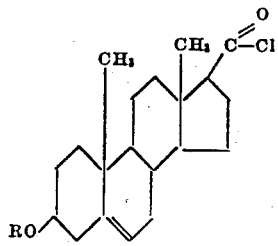

in which R is an acyl group, to the action of an organo-metallic compound selected from the class consisting of cadmium, zinc and aluminum alkyls and aryls to form ketones of the formula:

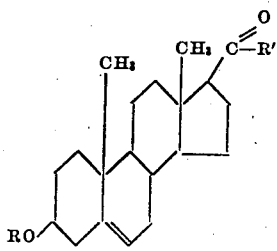

in which R' is a hydrocarbon group.

2. The process of claim 1 in which R is the acetoxy group.

3. The process of claim 1 in which R is the acetoxy group and the organo metallic compound is a methyl compound.

4. The process of claim 1 in which the organo metallic compound contains an aryl group.

5. The process of claim 1 in which the hydrocarbon group of the organo-metallic compound contains two or more carbon atoms.

6. Ketones of the formula:

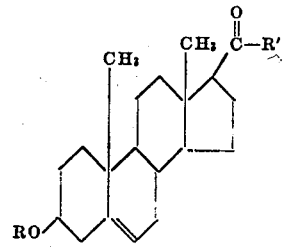

in which R is selected from the class consisting of hydrogen and acyl groups, and R' is an aryl group.

7. Ketones of the formula

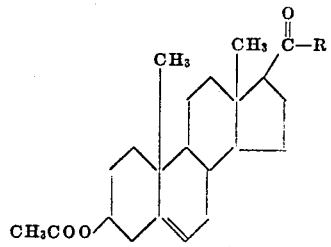

in which R is an aryl group.

8. 3-acetoxy-Δ⁵-etio cholenyl-phenyl ketone.

9. Ketones of the formula

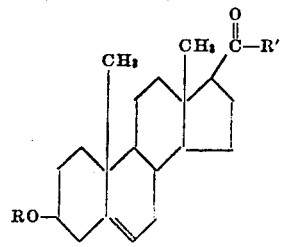

in which R is selected from the class consisting of hydrogen and acyloxy groups, and R' is an alkyl hydrocarbon group containing two or more carbon atoms.

10. Ketones of the formula

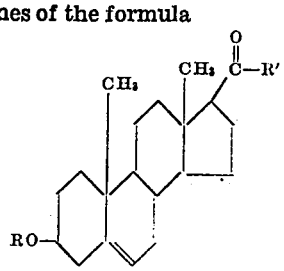

in which R is selected from the class consisting of hydrogen and acyloxy groups, and R' is a hydrocarbon group containing two or more carbon atoms.

PERCY L. JULIAN.
JOHN WAYNE COLE.